United States Patent [19]
Bayless

[11] 3,714,985
[45] Feb. 6, 1973

[54] STEAM OIL RECOVERY PROCESS
[75] Inventor: Jack H. Bayless, Houston, Tex.
[73] Assignee: Esso Production Research Company, Houston, Texas
[22] Filed: Sept. 1, 1971
[21] Appl. No.: 177,124

[52] U.S. Cl. ............................166/303, 252/8.55 D
[51] Int. Cl. .............................................E21b 43/24
[58] Field of Search......166/303, 272, 302, 311, 312, 166/261, 275; 252/8.55 D

[56] References Cited

UNITED STATES PATENTS

| | | | |
|---|---|---|---|
| 3,353,593 | 11/1967 | Boberg | 166/303 X |
| 3,410,345 | 11/1968 | Fradkin | 166/303 |
| 3,414,507 | 12/1968 | Calmon | 166/272 X |

Primary Examiner—Robert L. Wolfe
Attorney—James A. Reilly et al.

[57] ABSTRACT

Disclosed herein is a method for recovering oil from a subterranean oil bearing formation using steam. The steam is generated from water which has been treated to reduce the concentration of scale forming anions and to retain substantially all of the scale forming cations. The generated saturated steam has a gaseous phase and a liquid phase which contains scale forming cations, such as magnesium and calcium, and which is substantially free of scale forming anions, such as carbonate, bicarbonate, and sulphate. The steam including the cation-containing liquid phase is injected into the oil bearing formation in a steam oil recovery process.

10 Claims, No Drawings

STEAM OIL RECOVERY PROCESS

BACKGROUND OF THE INVENTION

1. Field of the Invention

This invention relates to a process for recovering oil from a subterranean formation utilizing steam. More specifically, this invention relates to a steam oil recovery process in which the raw water used to generate saturated steam has been treated to reduce the concentration of scale forming anions and to retain substantially all of the scale forming cations.

2. Description of the Prior Art suggested

Among the more promising methods that have been suggested or tried for the recovery of oil from viscous oil reservoirs are those which introduce thermal energy into the reservoirs. The thermal energy may be in a variety of forms such as hot water, in situ combustion, steam and the like. Each of these thermal energy agents may be useful under certain conditions. However, steam is generally the most efficient and economical and is clearly the most widely employed thermal energy agent.

Steam injection can increase oil production through a number of mechanisms. The viscosity of most oils is strongly dependent upon its temperature. In many cases, the viscosity of the reservoir oil can be reduced by 100 fold or more if the temperature of the oil is increased several hundred degrees. Steam injection can have substantial benefits in recovering even relatively light, low viscosity oils. This is particularly true where such oils exist in thick, low permeability sands where many fracturing techniques are not effective. In such cases, a minor reduction in viscosity of the reservoir oil can sharply increase productivity. Steam injection is also useful in removing wellbore damage at injection and producing wells. Such damage is often attributable to asphaltic or paraffinic components of the crude oil which clog the pore spaces of the reservoir sand in the immediate vicinity of the well. Steam injection can be used to remove these deposits from the wellbore.

One thermal oil recovery technique which utilizes steam is the "steam drive" process. In this process, steam is injected into one well and drives oil before it to a second, producing well. In another method, commonly called the "huff-and-puff" stimulation process, a single well is used for both steam injection and production of oil. The steam is injected through the tubing and into the formation. Injection is then interrupted and the well is permitted to heat-soak for a period of time. Following the heat-soak, the well is placed on a production cycle, and the heated fluids and withdrawn by way of the well to the surface.

In a typical field installation for the generation of steam for use in a steam drive or huff-and-puff process, raw water from a convenient source such as shallow water wells is fed to a raw water storage tank. The raw water inlet lines to the tank as well as the discharge lines are buried to reduce the entrainment of air in the water. In addition, a blanket of an inert gas, such as nitrogen, is maintained above the raw water in the tank to reduce oxygen contamination. Finally, an oxygen scavenger such as sodium sulphite may be added to the raw water. This strong reducing agent will form sodium sulphate by combining with any oxygen in the water.

The raw water is withdrawn from the storage tank and then passed through one or more cation exchange columns. Typically these ion exchange columns are in the sodium form. They remove most of the divalent cations, such as magnesium and calcium, and replace these ions with sodium. The softened water which is discharged from the cation exchange columns is tested for hardness and oxygen content before being passed to a soft water storage tank. Additional sodium sulfite may be added at this point to remove remaining oxygen. Generally, this soft water tank also has a blanket of inert gas to prevent oxygen contamination.

The soft water is then transferred by appropriate pumps and lines to conventional steam generators. These generators are capable of producing saturated steam at a temperature of 600°–800°F. at corresponding steam pressures. The quality of the generated steam will generally be between 50 and 90 percent, i.e., 50 to 90 percent of the steam will be gaseous and the remainder liquid. The high-temperature, high-pressure saturated steam is then discharged from the generator and introduced into one or more steam injection wells.

The purpose of eliminating oxygen from the boiler feed water is to reduce or eliminate corrosion of the steam generator boiler tubes. The oxygen content of the boiler feed water can be relatively low (as low as 0.1 ppm) and still be significantly corrosive, particularly where the pH of the feedwater is low, i.e., only slightly basic or lower.

The principal function of the use of the cation exchangers is to prevent scaling of the steam generator tubes. The principal scale forming agents are calcium and magnesium which will combine with carbonate, bicarbonate, and sulphate to form insoluble precipitates at the high temperature and reduced water concentration in the generator tubes. The resulting scale reduces heat transfer, wastes fuel and causes hot spots which can lead to overheating and tube failure. The cation exchangers remove most of the calcium and magnesium from the raw water and replace it with sodium. The sodium salts of carbonate, bicarbonate, and sulphate are much more soluble than the corresponding magnesium and calcium compounds and therefore have less tendency to form scales in the generator tubes. It has also been theorized that the sodium ions which are present in the softened generator feedwater will prevent or alleviate the problem of clay swelling which can occur when oil bearing formations are contacted with water containing little or no dissolved solids.

Although sodium-form cation exchangers have been used for many years in treating water for steam oil recovery processes, such a treating process is subject to a number of drawbacks. The expense of regenerating the cation exchange columns can be considerable. This is particularly true in areas where the cost of sodium chloride is high since this material is commonly used to regenerate the sodium form of the cation exchangers. Moreover, the typical field installation requires separate means for removing other undesirable constituents from the raw water such as oxygen and silica. As was previously noted, oxygen can be highly corrosive to the generator tube and silica compounds are capable of forming hard scale within the generator tubes. Not only must the oxygen be separately removed from the cations in the raw water, but the sodium sulphites used to scavenge the oxygen must be carefully controlled. Decomposition of sodium sulphite at higher pressures and concentrations leads to the liberation of sulphur dioxide and hydrogen sulfide in the steam. In addition, while there is some support for the theory that sodium ions in the liquid phase of the steam may prevent clay swelling, the sodium ion is less efficient in alleviating clay swelling than the divalent cations such as magnesium and calcium which it has replaced.

It is also known that there is a tendency for the formation fluids to form a water and oil emulsion in steaming operations. Such emulsions are not only difficult to treat at the surface following production but can substantially reduce the productive capacity of a producing well due to emulsion blockage. It is theorized that the sodium ion which is present in the liquid phase of the steam is a contributing factor to this problem. Under the high pH operating conditions in most steaming operations, the sodium will have a tendency to combine with naturally occurring acidic components of the formation crude oil to form the corresponding sodium salt. These sodium salts of organic acids or soaps promote the formation of oil and water emulsions due to their surface activity.

SUMMARY OF INVENTION

In the practice of this invention, oil is recovered from a subterranean formation using saturated steam. The steam is generated from raw water which has been treated to reduce the concentration of scale forming anions. The scale forming cations which are also present in the raw water are retained in the treated water which is used to generate saturated steam. The saturated steam including the cation-containing liquid phase is then injected into the formation, and oil is recovered from the formation by means of a steam stimulation process or a steam drive process.

The preferred means for treating the raw water is a strongly basic anion exchange medium such as a resin of styrene and divinyl-benzene with a quaternary ammonium functional group having an exchangeable chloride ion. When raw water contacts such a material, scale forming anions such as carbonate, bicarbonate, and sulphate are removed from the water and the chloride anion is substituted. Substantially all of the scale forming cations, such as calcium and magnesium, pass through the anion exchange medium without change. However, in the absence of scale forming anions, these cations will not produce any appreciable scale within the steam generator. In addition, the presence of calcium and magnesium in the liquid phase of the injected steam can be highly beneficial. These divalent ions are generally considered more beneficial in preventing clay swelling and may reduce the formation of surface active agents which contribute to emulsification of the formation crude oil. The anion exchange medium has the additional advantage of reducing the expense of regeneration in many instances and can simultaneously remove other undesirable constituents from the raw water, such as oxygen.

DESCRIPTION OF THE INVENTION

In the practice of the process of this invention, suitable raw feed water containing scale forming anions and cations is obtained from a convenient source such as water wells, lakes, streams, and the like. The raw feed water is fed through suitable flow lines to a storage tank and is then withdrawn by suitable pumping means and flow lines and introduced into one or more anion exchange columns.

These anion exchange columns will generally be arranged in series-parallel. That is to say, several anion exchange columns will be arranged in series with one or more columns used as primary exchangers which then discharge to one or more corresponding columns for final treatment. A similar bank of anion exchange columns will generally be arranged in parallel with the first bank. The second bank can thus be regenerated by back flushing while the first bank is in service and vice versa. The treated water discharges from the anion exchange columns and is introduced to a treated water storage tank.

Prior to introducing the treated water into the treated water storage tank, the oxygen content and silicate content of the water will be checked. In most cases, it will be preferred to use an oxygen-free gas blanket on the raw storage and treated water storage tanks to prevent the contamination of the water by oxygen-containing air. As will be discussed in more detail hereinafter, the anion exchange columns have the ability to extract entrained oxygen from the raw water. In many instances, the removal of oxygen by the anion exchange columns will be satisfactory and no further treatment will be necessary. However, in the event the oxygen content of the treated water is excessive, the water can be further deoxygenated by conventional substances such as sodium sulphite, sodium sulphite in combination with catalytic substance such as cobalt sulphate, hydrazine, natural gas stripping, or deaeration by heat or vacuum.

Also prior to introducing the treating water into the treated water storage, the pH of the water is checked and adjusted, if necessary. Generally the pH of the treated water should be between 7.0 and 9.0. The upper limit of the pH range should be carefully checked where the water contains appreciable quantities of magnesium since excess quantities of hydroxide ion will have a tendency to precipitate magnesium hydroxide within the tubes of the steam generation system. The treated water is then transferred by suitable pumps and flowlines to the steam generation system.

Typically one or more once-through steam generators will be employed to produce the necessary quantities of steam to be injected into the formation. As was previously stated, such generators have a capability of producing saturated steam with a quality of 50 to 90 percent at high temperatures and pressures.

The steam which is produced in the steam generators is introduced by a steam injection well into the oil bearing formation. Depending upon the characteristics of a particular oil bearing formation and the state of depletion of the formation, the steam may be injected to stimulate the formation in a huff-and-puff process or may be continuously injected t drive oil through the formation from the injection well to an offset, production well.

Before discussing other features of this invention, it may be helpful to discuss the process of ion exchange in general and the anion exchange used in the practice of this invention. Ion exchange may be defined as a reversible exchange of ions between a solid and a liquid in which there is no substantial change in the structure of the solid. In this definition the "solid" is the ion-exchange material or resin particle. The ion exchange reaction can be shown in a simplified fashion by:

$$RA + B \rightleftarrows RB + A$$

Where:
R is the ion exchange material.
A is an exchangeable ion associated with the functional group of the ion exchange material.
B is an ion present in the liquid.

As an example of the ion exchange mechanism, the ion exchange material in the prior art cation exchange has a matrix or latice of a suitable resin with attached functional groups. These functional groups are generally the sodium salts of acids, such as sulphonic, carboxylic, or phosphonic. When such a sodium cycle ion exchange material is contacted with water containing divalent cations, such as magnesium and calcium, the magnesium and calcium attach to the functional group of the resin. Simultaneously, sodium ion is stoichiometrically released from the ion exchange material and goes into solution in the water.

In the practice of this invention, anion exchange is employed. In the anion exchange reaction, the exchangeable ions on the functional group of the matrix and the ions removed from the water which contacts the ion exchange material are anionic. While certain naturally occuring substances, such as kaolinite and montmorillonite, can function as anion exchange materials, the preferred materials for use in the practice of this invention are man-made resins. These resins are available in a variety of forms including beads and gels.

The preferred anion exchange resins for use in the practice of this invention are the strongly basic type. Suitable anion exchange materials of this type are sold by Rohm and Haas Company, Philadelphia, Pa., under the trade name Amberlite IRA-900 and by the Dow Chemical Company, Midland, Mich., under the trade name Dowex 1. The matrix or latice of these anion exchange materials are synthetic, organic resins prepared by the copolymerization of styrene and divinylbenzene. The functional group on these resins is a quaternary ammonium having an associated exchangeable chloride ion.

The preferred form of anion exchange resin for use in this invention is the bead form. These beads can best be described by comparing them with small balls of tough, rigid sponge having large discreet pores. When raw untreated water flows through this anion exchange medium, the scale contributing anions such as carbonate, bicarbonate and sulphate are removed and chloride is stoichiometrically taken into the aqueous solution. In addition to removal of these anions, the strongly basic anion exchangers have the capability of deoxygenating and desilicizing the raw water. In certain instances, the removal of silica compounds and oxygen from the water may be incomplete. However, even in those instances, the additional treatment to remove these compounds will be lessened.

The use of such anion exchange for treating water to be used in steam oil recovery operations can perform a number of desirable functions. Anion exchange can effectively reduce the concentration of the scale contributing anions in the water. The chlorides of calcium and magnesium are much more highly soluble at the high operating temperature within the generator than the corresponding sulphates and carbonates. The higher solubility of these chlorides will, of course, reduce the tendency for scale formation. Moreover, calcium chloride does not exhibit inverse solubility as does calcium carbonate; the solubility of calcium carbonate decreases with increasing temperature. Thus at the elevated temperature within the generator, there would be a strong tendency for calcium carbonate to precipitate and form scale on the boiler tubes — the corresponding chloride would have less of a tendency to so precipitate. Thus anion exchange can perform a specific function, i.e., it will decrease the tendency of precipitation of dissolved solids at the operating temperatures of the steam generators.

In addition, since anion exchange removes the anions rather than the cations from the raw water, the divalent cation concentration of the feed water is substantially maintained. Simultaneously, the concentration of sodium ions in the liquid phase of the steam is less than it would be in a sodium cycle cation exchange system. Finally, since the strongly basic anion exchange resins have the capability of removing oxygen and silica compounds from the raw water, the additional treatment for removal of these compounds can be reduced, if not eliminated.

A number of benefits accrue from the use of these anion exchange resins. There is of course the reduction in scale formation in the steam generator. Perhaps less obvious benefit is the reduction in the regeneration cost for the ion exchange columns. This can perhaps be most easily seen in an analysis of a typical brackish water. The composition listed in Table I closely approximates the concentration of dissolved solids in the water of Lake Maracaibo, Venezuela.

TABLE I

BRACKISH WATER COMPOSITION

| Ion | Parts per million in water | Moles per million pounds of water |
|---|---|---|
| Mg | 358 | 14.7 |
| Ca | 76 | 1.9 |
| Na | 2073 | 94.5 |
| $CO_3$ | 50 | 0.8 |
| $SO_4$ | 232 | 2.4 |
| Cl | 4135 | 116.8 |

As can be seen from Table I, this water contains 16.6 moles of calcium and magnesium per 1,000,000 pounds of water. If cation exchange is used to remove calcium and magnesium from this water and assuming 100 percent efficiency, it would require 33.2 moles of sodium chloride per one million pounds of treated water to regenerate the cation exchange medium since two moles of monovalent sodium are needed to displace one mole of the divalent cations. However, if only the carbonate and sulphate are removed using the anion exchange of this invention, only 6.4 moles of sodium chloride would be required for regeneration. This represents better than a five fold reduction in the chemicals for regeneration.

Additionally, the anion exchange system of this invention provides single step-forming anion removal, deoxygenation and desilicizing. This single-step operation can reduce the capital costs of additional equipment which would otherwise be required for multi-step removal of these compounds and will reduce the cost of associated chemicals. Since the magnesium and calcium are retained in the treated water, the benefits of reduced clay swelling are increased. As was previously stated, these divalent cations are generally considered superior to monovalent sodium in reducing clay swelling.

Anion exchange may also reduce the formation of oil and water emulsion and reduce the attendant problems of surface emulsion breaking and of formation plugging by the emulsion. It is generally known that naturally occurring acids in the reservoir oil will combine with sodium ions in a high pH environment to form soaps or surface active agents which will promote emulsification of oil and water. However, calcium and magnesium will combine more readily with these acids than will sodium, and the calcium and magnesium salts of these acids are not strongly surface active. These salts are normally oil soluble and will have little tendency to emulsify the reservoir oil. Since anion exchange does not remove calcium and magnesium from the raw water, these ions will be available in the liquid phase of the steam to combine with the acids in the oil to prevent or reduce the formation of the surface active sodium soaps. Thus, anion exchange will result in less sodium and more calcium and magnesium in the steam that will cation exchange. The net result of anion exchange should, therefore, be a reduction in the problems of emulsification.

The anion exchange system also gives the operator greater flexibility in the choice of raw feed water. Certain feed waters contain such high concentrations of calcium and magnesium that they are not directly suitable for use in a cation exchange system. The water must be pretreated, for example by the hot lime process, to remove a portion of these constituents prior to softening in a cation exchange system or alternate water sources must be located and used. Since the anion exchange system of this invention does not remove calcium and magnesium from the raw feed water, the presence of these constituents is much less of a problem.

The principle of the invention and the best mode in which it is contemplated to apply that principle have been described. It is to be understood that the foregoing is illustrative only and that other means and techniques can be employed without departing from the true scope of the invention as defined in the following claims.

What is claimed is:

1. A method for recovering oil from a subterranean oil bearing formation comprising obtaining raw water containing scale forming anions and cations, treating the raw water to reduce the concentration of the scale forming anions and to retain substantially all of the scale forming cations, using the treated water to generate saturated steam having a gaseous phase and a liquid phase containing scale forming cations, injecting the saturated steam containing scale forming cations into the formation, and recovering oil from the formation.

2. A method as defined by claim 1 wherein the raw water is treated with a strongly basic anion exchange resin to reduce the concentration of the scale forming anions.

3. A method as defined by claim 2 wherein the strongly basic anion exchange resin has a matrix comprising styrene and divinylbenzene and a functional group comprising quaternary ammonium with an exchangeable chloride substituent.

4. A method as defined by claim 1 wherein the pH of the treated water is maintained between 7.0 and 9.0.

5. A method as defined by claim 1 wherein the steam in injected into the formation by means of a well and oil is recovered from the formation by means of the same well.

6. A method as defined by claim 1 wherein the steam is injected into a formation by means of a well and oil is recovered from the formation by means of an offset, producing well.

7. A method as defined by claim 1 further comprising treating the raw water to reduce oxygen contamination.

8. A method as defined by claim 1 further comprising treating the treated water to reduce oxygen contamination.

9. A method for recovering oil from a subterranean oil bearing formation comprising obtaining raw water containing cations of the group consisting of calcium and magnesium and anions of the group consisting of carbonate, bicarbonate and sulphate, contacting the raw water with a strongly basic anion exchange resin to form treated water containing the cations and being substantially free of the anions, using the treated water to generate saturated steam having a gaseous phase and a liquid phase which is substantially free of the anions and which contains the cations, injecting the saturated steam containing the cations into the formation and recovering oil from the formation.

10. An improved method for treating water to be used for the formation of steam in a steam oil recovery process wherein raw water is treated to remove scale forming constituents to form treated water, the treated water is used to generate saturated steam, the saturated steam is injected into the formation and oil is recovered from the formation in which the improvement comprises contacting the raw water with a strongly basic anion exchange resin to simultaneously deoxygenate, desilicize, and remove scale-forming anions from the raw water.

* * * * *